United States Patent
Lorenz et al.

[19]

[11] Patent Number: 5,828,146
[45] Date of Patent: Oct. 27, 1998

[54] APPARATUS FOR THE BIDIRECTIONAL TRANSFER OF INFORMATION

[75] Inventors: Gerhard Lorenz, Krefeld; Ernst Luhn, Haan; Lothar Zell, Düsseldorf, all of Germany

[73] Assignee: BFI Betriebstechnik GmbH, Dusseldorff, Germany

[21] Appl. No.: 514,434

[22] Filed: Aug. 11, 1995

[30] Foreign Application Priority Data

Aug. 13, 1994 [DE] Germany ............ 44 28 790.9

[51] Int. Cl.⁶ ............................................. H02P 9/30
[52] U.S. Cl. ................ 310/68 D; 310/68 R; 310/68 E; 310/68 B
[58] Field of Search ................ 310/68 R, 68 D; 318/25, 771

[56] References Cited

U.S. PATENT DOCUMENTS

| | | | |
|---|---|---|---|
| 3,757,182 | 9/1973 | Chalmers et al. | 318/186 |
| 4,109,998 | 8/1978 | Iverson | 350/23 |
| 4,520,300 | 5/1985 | Fradella | 318/603 |
| 4,568,862 | 2/1986 | Tassinario | 318/254 |
| 4,570,094 | 2/1986 | Trommer | 310/68 R |
| 4,949,023 | 8/1990 | Shlien | 318/541 |
| 5,243,268 | 9/1993 | Klatt | 318/771 |
| 5,371,814 | 12/1994 | Ames et al. | 385/25 |

FOREIGN PATENT DOCUMENTS

| | | |
|---|---|---|
| OS3140978 | 5/1983 | Germany. |
| 4034578A1 | 5/1992 | Germany. |

*Primary Examiner*—Steven L. Stephan
*Assistant Examiner*—Elvin G. Enad
*Attorney, Agent, or Firm*—The Bell Seltzer Intellectual Property Group Of Alston & Bird LLP

[57] ABSTRACT

Apparatus for the bidirectional transfer of information comprises in each case: at least one rotating component (1); a further component (2); receivers (4, 5) on the respective components (1, 2), said receivers facing one another in groups on the axis of rotation (6) of the rotating component (1); and transmitters (7, 8) fitted on the components (1, 2) eccentrically with regard to the axis of rotation and directed towards the corresponding receivers (4, 5).

11 Claims, 1 Drawing Sheet

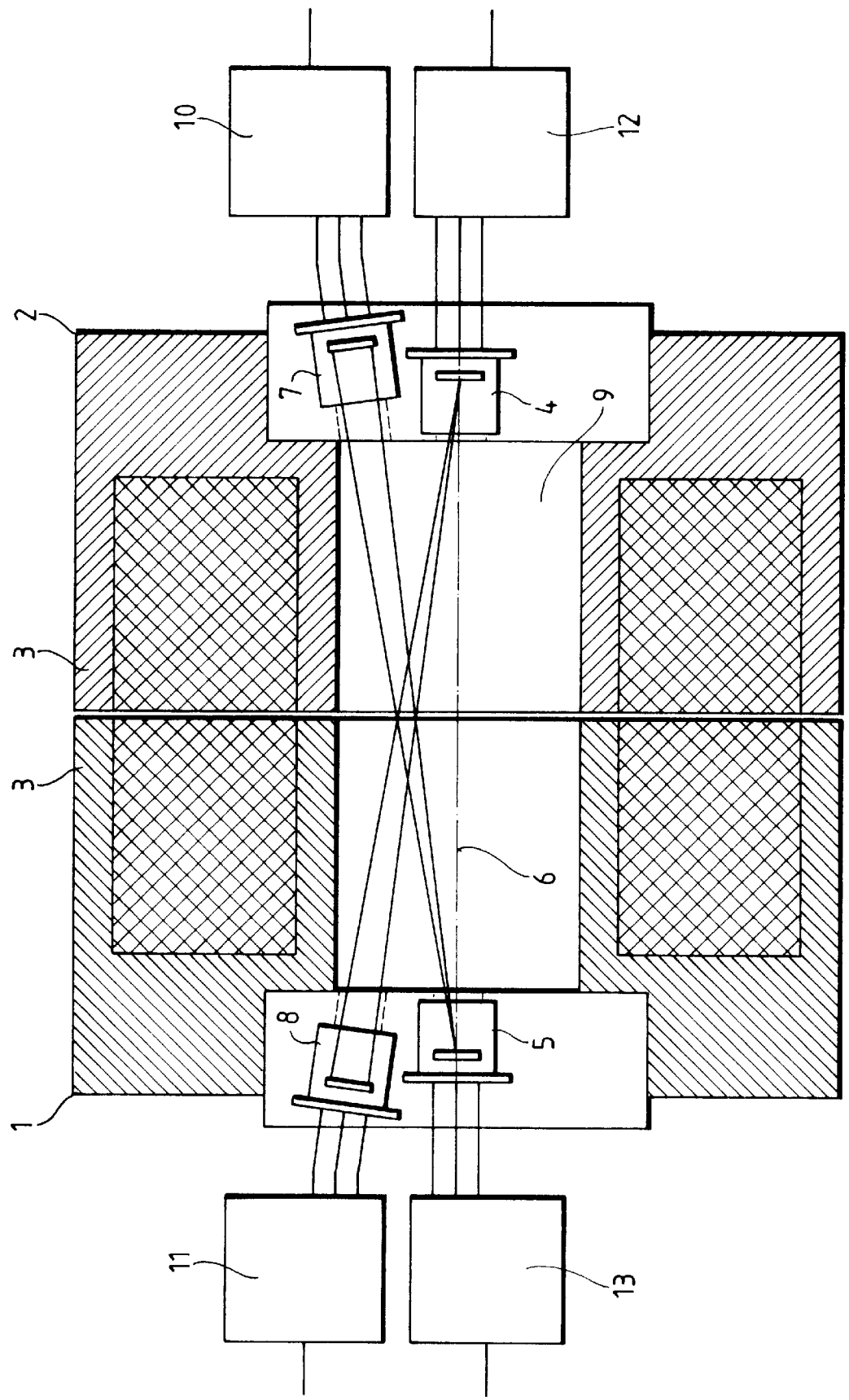

APPARATUS FOR THE BIDIRECTIONAL TRANSFER OF INFORMATION

TECHNICAL FIELD OF THE INVENTION

The invention relates to apparatus for the bidirectional transfer of information in systems having at least one rotating unit, for example from a rotor to a stator.

BACKGROUND OF THE INVENTION AND PRIOR ART

For the transfer of information, for example from and to shafts, mechanical processes such as slip-ring processes, mercury bath processes and telemetry processes are known.

In such processes the problem arises that the quality and quantity of transfer are limited. Particularly in the case of mechanical systems, wear and inaccuracy of transfer on account of potential fluctuations give rise to problems. While these problems are not so great when mercury cells are used, these have their own disadvantage of a high outlay on maintenance owing to changes in the mercury bath with time due to contamination and amalgam formation.

A particular problem that arises in the case of known transfer systems is the connection, typical of the system, of the energy supply to the frame potential and the supply voltage, since the transfer can be impaired by naturally occurring potential fluctuations. In addition, interference can be further amplified by the usual analog signal transfer. This can lead to falsification of the information in the course of transfer. The high wear leads to all mechanical systems having high maintenance costs.

In contrast to this, German Offenlegungsschrift 40 34 578 describes a rotary transmitter which avoids the disadvantages of the mechanical and mercury cell transfer systems. This comprises a stator and a rotor. The stator has an interface for a digital control signal, an interface for transfer of energy to the rotor and an interface for the incoming signal from the rotor, while the rotor includes modules for processing the measurement signals, for processing the control signals and for supply voltage conditioning. The energy for the rotor modules is transmitted by means of a pot-type core transformer the primary winding of which is located in the stator, and is consequently stationary, while the secondary winding is in the rotor, the two windings being so arranged that an inductive energy supply is obtained for the rotor and its modules.

For the optical transfer of the information output from the rotor a transmitter diode is located on the axis of rotation of the rotor at the interface to the stator and a receiver diode facing the transmitter diode is located in the stator on the prolongation of this axis. Because of the course of the transfer path on the axis of rotation the signals output from the rotor diode can be transmitted without interference and continuously. However, for the control of its modules the rotor requires a control signal, which must be transmitted from the stator to the rotor. Since a transfer on the axis of rotation, which is already occupied, is excluded, a high constructional outlay is necessary to provide another transfer path.

For the transfer of the control information from the stator to the rotor the Offenlegungsschrift proposes a central receiver diode, fixed to the rotor, with a ring of transmitter diodes on the stator side and distributed equidistantly around it.

The twelve transmitter diodes required to cover the light signals for one revolution are located in the stator ring surrounding the receiver diode on the rotor side. The transfer of information between rotor and stator by means of thirteen diodes (twelve transmitters and one receiver) involves a high constructional outlay. The transfer path which lies on the axis of rotation and makes possible a simple direct transfer using one transmitter and one receiver is already occupied by the transmitter of the rotor and the receiver of the stator. Apart from the disadvantage of the large number of transmitter diodes and the additional cost of manufacture of the diode carrier, the quantity of data that can be transferred is in principle limited to about two Mbit/s. This is because owing to the rotation of the receiver diode the signal path formed between the ring of transmitter diodes and the receiver diode is not continuous but is spatially amplitude-modulated.

OBJECT OF THE INVENTION

It is an object of the invention to provide an apparatus for the transfer of information from and to rotating systems which avoids the disadvantages of mechanical, contact and radio transfer, which makes use of the advantages of a direct optical signal transfer for both directions of transfer and consequently can transmit a larger quantity of data, and which in itself involves low manufacturing costs.

SUMMARY OF THE INVENTION

To this end, an apparatus according to the invention for the bidirectional transfer of information comprises in each case: at least one rotating component; a further component; receivers on the respective components, said receivers facing one another in groups on the axis of rotation of the rotating component; and transmitters fitted on said components eccentrically with regard to the axis of rotation and directed towards the corresponding receivers.

This solution of the problem is based on the principle of positioning both the receiver of the rotating unit and the receiver of the non-rotating unit on the axis of rotation or a prolongation thereof, and of arranging the respective transmitters in the region of the axis of rotation with their transmission beam directed towards the opposite receiver and inclined with regard to the axis of rotation.

In the apparatus according to the invention the receivers located on the axis of rotation of the systems that rotate relative to one another face one another. In contrast to the conventional transfer systems, in the apparatus according to the invention no transfer path is set up directly on the axis of rotation.

The signals are in each case transmitted from one or more transmitters to the receiver located opposite. This transfer can take place in two directions, since in contrast to the known systems using central transfer the axis of rotation, as described above, is not occupied. In accordance with the invention the transmitters have a transmitting beam which is inclined with regard to the axis of rotation and is directed towards the receiver opposite.

The transmitters can be arranged directly in the vicinity of the receiver, so that the aperture angle of the receiver opposite them remains small.

Preferably the receiver and transmitter are connected to pulse code modulators, which enable coding of the transmitted signal to be performed.

The transfer system can be used with particular advantage in the case of optical rotation transmitters for rotating measuring and information systems. Here the whole apparatus can, in the case of the transmitter described above, be accommodated inside the transformer ring. Consequently an expensive ring of diodes for the transmission of signals to the rotor can be dispensed with. Furthermore, the apparatus according to the invention offers the advantage that the quantity of data that can be transmitted is the same in both directions and is far superior to the conventional systems. In addition, the transfer of data takes place simultaneously in both directions and continuously. Moreover the exchange of parts presents no problems, owing to the simple construction of the transmitter and receiver units.

BRIEF DESCRIPTION OF THE DRAWINGS

The invention will now be described in more detail, by way of example, with reference to an embodiment shown in FIG. 1.

FIG. 1. shows a schematic cross-section through an eccentric information transmitter.

DETAILED DESCRIPTION OF A PREFERRED EMBODIMENT OF THE INVENTION

As shown in FIG. 1, the information transfer takes place at the interface of a rotor 1 with a stator 2 in the region of the rotor axis 6. The transmitter is located in the centre 9 of a pot-type core transformer 3. A receiver 4 of the stator 2 and a receiver 5 of the rotor 1 are arranged facing one another on the rotor axis 6. Outside the rotor axis 6, and eccentrically to the rotor axis, a stator transmitter diode 7 is located in the region of a stator receiver diode 4 and a rotor transmitter diode 8 is located in the region of the rotor receiver diode 5. The transmitter diodes 7, 8 are inclined at such an angle that the optical signal of the transmitter is directed towards the respective receiver diode 4, 5 located opposite it on the axis of rotation 6. The receiver diodes 4, 5 have an aperture angle sufficient for the reception of signals of the eccentrically arranged transmitter diodes. As a result of the eccentric position of the transmitter diodes 7, 8 the transmitter diode 8 moves from side to side as the rotor rotates, while the beam transmitted from it remains continuously directed towards the receiver diode 4 of the stator. At the same time the beam transmitted from the transmitter diode 7 of the stator remains constantly directed towards the rotating receiver diode 5 of the rotor. Within the protected centre 9 of the pot-like core transformer 3 the optical information transfer can proceed without any problems and free from interference. By pulse code modulation by means of the pulse code modulator modules 10, 11, 12, 13 which are connected to the transmitter diodes 7, 8 and to the receiver diodes 4, 5 the input and output signals are coded for optimum transfer.

Through this construction a high rate of bidirectional data transfer can be achieved, and at the same time the constructional outlay is reduced to a minimum.

What is claimed is:

1. An apparatus for providing bidirectional signal transfer comprising:
   first and second components having respective end portions disposed in a facing relationship such that at least one of said first and second components rotates relative to the other component about an axis of rotation which extends through both said first and second components;
   each of said first and second components comprising:
      a receiver disposed along the axis of rotation and having a predetermined aperture angle within which the receiver effectively receives signals; and
      a transmitter, offset from the axis of rotation and positioned at an angle toward the axially disposed receiver of the other component, for directly transmitting signals to the axially disposed receiver of the other component and within the aperture angle of the axially disposed receiver of the other component such that signals are bidirectionally transferred between said first and second components as each component rotates relative to the other component.

2. An apparatus according to claim 1 wherein said first component is a rotating component which rotates about the axis of rotation, and wherein said second component is a stationary component disposed in a rotationally stationary position relative to the axis of rotation.

3. An apparatus according to claim 2 wherein said rotating component is a rotor defining a rotor axis extending collinear with the axis of rotation, and wherein said stationary component is a stator.

4. An apparatus according to claim 1 wherein each of said first and second components further comprises an annular transformer winding extending about said receiver and said transmitter of the respective component.

5. An apparatus according to claim 1 wherein said receiver of each of the components is an optical receiver for receiving optical signals, and wherein said transmitter of each of the components is an optical transmitter for transmitting optical signals.

6. An apparatus according to claim 1 wherein each of said first and second components further comprises a pulse code modulator, operably connected to said receiver and said transmitter of the respective component, for modulating the signals transmitted and received thereby.

7. An apparatus for providing bidirectional signal transfer comprising:
   a rotor which rotates about an axis of rotation; and
   a stator disposed adjacent said rotor in a facing relationship thereto such that the axis of rotation extends therethrough, said stator also being positioned rotationally stationary relative to the axis of rotation;
   wherein each of said rotor and said stator comprises a receiver, disposed along the axis of rotation and having a predetermined aperture angle within which the receiver effectively receives signals, and a transmitter, offset from the axis of rotation and positioned at an angle toward the other receiver, for directly transmitting signals to the other receiver and within the aperture angle of the other receiver such that signals are bidirectionally transferred between said rotor and stator as said rotor rotates relative to said stator.

8. An apparatus according to claim 7 wherein each of said rotor and said stator further comprises an annular transformer winding extending about said respective receiver and said respective transmitter.

9. An apparatus according to claim 8 wherein said annular transformer winding of said rotor is a secondary winding, and wherein said annular transformer winding of said stator is a primary winding for electrically cooperating with said secondary winding to thereby supply energy to said rotor.

10. An apparatus according to claim 7 wherein each of said receivers is an optical receiver for receiving optical signals, and wherein each of said transmitters is an optical transmitter for transmitting optical signals.

11. An apparatus according to claim 7 wherein each of said rotor and said stator further comprises a pulse code modulator, operably connected to said respective receiver and said respective transmitter, for modulating the signals transmitted and received thereby.

* * * * *